April 26, 1949.

L. R. GOETZ 2,468,625

ELECTRICAL BRIDGE CIRCUIT FOR TESTING
THE VALUE OF RESISTORS

Filed Oct. 1, 1945

INVENTOR
Lawrence R. Goetz
BY Chester F. Carlson
ATTORNEY

Patented Apr. 26, 1949

2,468,625

UNITED STATES PATENT OFFICE 2,468,625

ELECTRICAL BRIDGE CIRCUIT FOR TESTING THE VALUE OF A RESISTOR

Lawrence Raymond Goetz, Indianapolis, Ind., assignor to P. R. Mallory & Co., Inc., Indianapolis, Ind., a corporation of Delaware Application October 1, 1945, Serial No. 619,717

2 Claims. (Cl. 175—183)

This invention relates to electrical testing circuits.

An object of this invention is to provide an improved circuit for testing circuit components.

Further objects will be apparent from the following specification and claims, taken in connection with the accompanying drawings, in which:

This invention is particularly concerned with Wheatstone bridge type comparison circuits for testing resistance, capacitance or inductance units to determine whether their values lie within prescribed limits. While circuits using either resistance, capacitance or inductance units or combinations thereof come within the scope of this invention, as an illustrative embodiment of this invention, the circuits disclosed herein are utilized for testing resistance units.

In the manufacture of electrical resistors, it is important to have means for rapidly testing the finished resistors to determine whether their values lie within prescribed manufacturing tolerances.

In the past this has been accomplished by using a conventional four-leg Wheatstone resistance bridge forming a parallel circuit with first and second resistors of known value in series on one side of the circuit and the resistor to be tested and a third resistor of known value in series on the other side of the circuit. A galvanometer is connected across the parallel circuit to a point on each side of the circuit between the series connected resistors.

Two separate tests have been necessary, one to determine whether the resistor under test has a value above the low tolerance limit, and another to determine whether this value is below the high tolerance limit. In the low limit test, the resistors of known value in the test circuit, that is, the first, second, and third resistors as described above, are selected with respect to value to produce a balance in the parallel circuit if the resistor under test has a value identical with the low tolerance limit. This balance is indicated by a zero reading on the galvanometer, indicating zero potential drop across the test circuit. If the unknown resistor value is above or below the low tolerance limit, the galvanometer indicator is correspondingly deflected to one side or the other. In the high limit test at least one of the resistors of known value is adjusted or replaced so that balance is achieved if the unknown resistor value is identical with the high tolerance limit.

This repetitive test method has the disadvantage that time is taken up in waiting for the sensitive galvanometer to settle to its reading, in changing over to the second test, and in again waiting for the galvanometer to settle.

This invention provides a test circuit which enables both the high and low tolerance limit tests to be made simultaneously. Essentially this is achieved by combining two bridge circuits with the resistor to be tested common to both.

Figure 1:
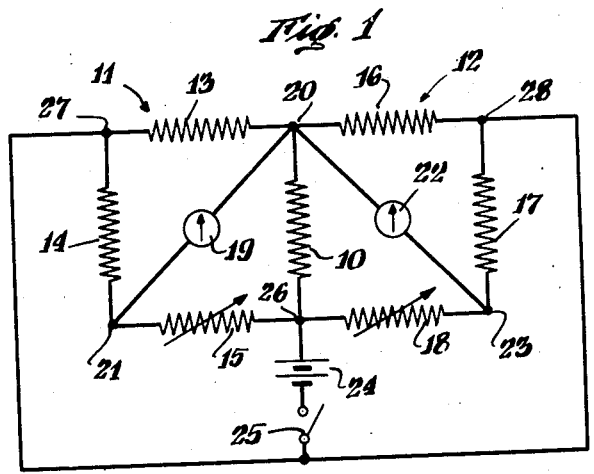
Figure 1 shows a resistor circuit in an illustrative embodiment of this invention.

Referring to Figure 1, the circuit comprises a resistor to be tested as shown at 10 which forms a portion of two Wheatstone bridge circuits generally indicated at 11 and 12. In the example shown, the bridge 11 is utilized to determine whether the value of the test resistor is below the lower tolerance limit and, to this end, said bridge 11 may comprise balancing resistors 13, 14 and a variable resistor 15 which is preferably adjusted to the lowest acceptable value for the test resistor 10. In this circuit, the bridge 12 may be used to determine whether the value of the test resistor exceeds the upper tolerance limit, said bridge 12 comprising balancing resistors 16, 17 together with a variable resistor 18 which is preferably adjusted to the highest acceptable value for the test resistor.

A galvanometer 19 may be connected between a common point 20 of the bridge circuits and the corner 21 of bridge 11. In similar fashion, a galvanometer 22 may be connected between the common point 20 and the corner 23 of bridge 12. A suitable circuit, which may include a battery 24 and a switch 25, is utilized to apply a potential between a common point 26 of the bridge circuits and the corners 27 and 28 of the respective bridges.

The described circuits may be conveniently balanced by selecting circuit components such that the value of resistors 13 and 16, e. g. 2,000 ohms, is twice the value of the resistors 14 and 17, e. g. 1,000 ohms. In this connection, it will be noted that one branch of the circuit is formed by the battery 24, the switch 25, the parallel-connected resistors 13, 16 and the resistor 10. Accordingly, when equal currents flow through all branches of the system and the values of the resistors are chosen in the manner stated, the voltage drop between the battery and the portion 20 of the circuit—i. e. the voltage drop across the parallel-connected resistors 13 and 16—is equal to the voltage drop between the battery and the corner 21 of bridge 11—i. e. the voltage drop across resistor 14—which, in turn, is equal to the voltage drop between the battery and the corner 23 of bridge 12—i. e. the voltage drop across resistor 17. As a result, bridge 11 will be balanced when the value of the test resistor 10 is equal to the effective value of the variable resistor 15 and bridge 12 will be balanced when the value of test resistor 10 is equal to the effective value of the variable resistor 18. Of course, the bridge circuits may be balanced by utilizing circuit components of different values and the galvanometer-battery connections may be modified without departing from the spirit and scope of the invention.

Figure 3:
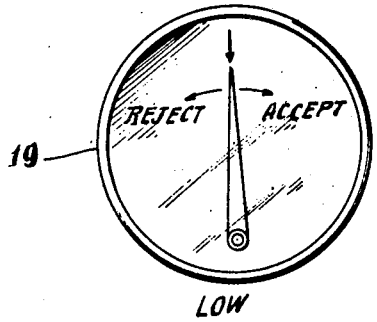
Figures 3 and 4 show the galvanometers used in the circuits of Figures 1 and 2.
Figure 4:
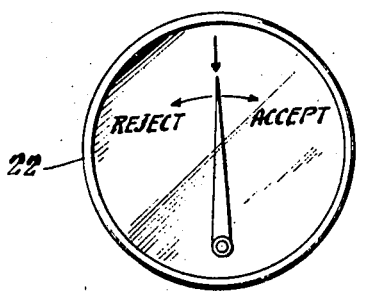

As shown by Figures 3 and 4, the galvanometers 19 and 22 may be conveniently provided with vertical arrows which indicate when the respective bridge circuits are balanced and said galvanometers may be suitably calibrated to indicate whether the value of the test resistor is within the prescribed tolerance range. Referring particularly to Figures 1 and 3, and assuming that the switch 25 is closed, if the value of the test resistor 10 is lower than the effective value of resistor 15 which is adjusted to the lowest acceptable resistance value, the bridge 11 will be unbalanced and a current will flow through galvanometer 19 of proper polarity to swing the needle onto the "reject" portion of the dial. If the value of the test resistor is greater than the effective value of resistor 15, a current of opposite polarity will flow through the galvanometer 19 causing the needle to swing onto the "accept" portion of the dial. In similar fashion, the needle on galvanometer 22, Figure 4, will swing onto the "reject" portion of the dial if the value of the test resistor 10 is greater than the maximum acceptable value as determined by the setting of variable resistor 18 while said needle will swing onto the "accept" portion of the dial if the value of the test resistor 10 is less than the maximum acceptable value. Consequently, it is only necessary for the operator to take one glance at the galvanometer dials in order to determine whether a test resistor should be accepted or rejected. The test resistor may be conveniently connected in circuit as by clips or prods in order to facilitate a rapid testing operation by permitting the test resistors to be easily placed in the testing circuit or removed therefrom.

Figure 2:
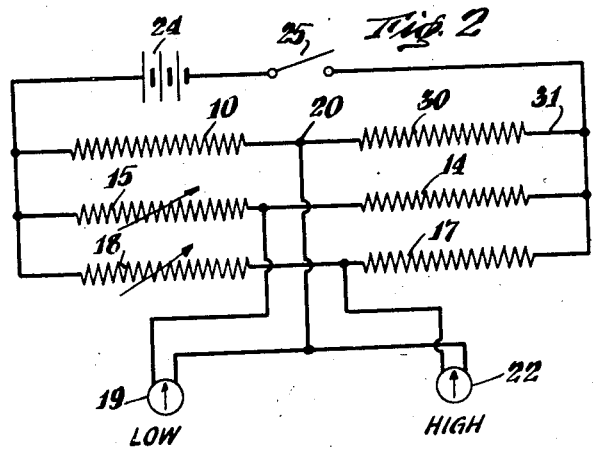
Figure 2 shows a modified form of the circuit of Figure 1.

A modification of the invention is illustrated in Figure 2 in which parts similar to those already described are indicated by like reference characters. In this modification, the resistors 13 and 16, Figure 1, are replaced by a resistor 30 which, in this case, may conveniently have the same value as resistors 14 and 17. One terminal of said resistor 30 is connected to the common circuit portion 20, and the other terminal thereof is attached to a conductor 31 which interconnects said resistor 30, the resistors 14, 17 and one terminal of the switch 25. The operation of this modified circuit is similar to the operation of the circuit shown in Figure 1.

It will be apparent that the circuit may be modified for testing circuit components other than resistors and such modifications are to be considered within the purview of the invention. The circuits disclosed in this application may obviously be used to test a circuit component having an unknown value as well as for testing such circuit components as part of the manufacturing process.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. In an electrical circuit for testing the value of a resistor, a test resistor, first and second bridge elements each having one end thereof connected to one terminal of said test resistor, each element comprising a pair of series connected resistors, one being a fixed resistor and the other being a variable resistor, a first zero center galvanometer connected between the other terminal of said test resistor and the junction of one pair of series connected resistors, a second zero center galvanometer connected between the other terminal of said test resistor and the junction of the second pair of series connected resistors, a conductor connecting the other ends of said bridge elements, a resistor common to both of said bridge elements connected between said conductor and said other terminal of the test resistor, and a battery connected between said conductor and the first terminal of the test resistor, the values of said resistors being chosen to form a pair of balanced bridge circuits with the test resistor and its associated fixed resistor common to both of said bridge circuits whereby the setting of one variable resistance determines the upper limit of the tolerance range as indicated upon the associated galvanometer, and the setting of the other variable resistor determines the lower limit of the tolerance range as indicated by the galvanometer associated therewith.

2. In an electrical circuit for testing the value of a resistor which embodies a pair of simultaneously operable indicators, one for indicating whether the value of a test resistor is above a predetermined tolerance range and the other for indicating whether the value of such test resistor is below the tolerance range, a pair of bridge elements each comprising a fixed resistor, a variable resistor and a junction between said resistors, a unit comprising a test resistor and a series connected fixed resistor connected across the terminals of both bridge elements, a battery connected across the terminals of said unit, and a pair of galvanometers of the zero center type each having one terminal connected to the junction between said test resistor and said series connected fixed resistor and their other terminals connected to the respective junctions of said bridge elements, the values of said resistors being chosen to form a pair of balanced bridge circuits with the test resistor and its associated fixed resistor common to both of said bridge circuits whereby the setting of one variable resistance determines the upper limit of the tolerance range as indicated upon the associated galvanometer, and the setting of the other variable resistor determines the lower limit of the tolerance range as indicated by the galvanometer associated therewith.

LAWRENCE RAYMOND GOETZ.

REFERENCES CITED

The following references are of record in the file of this patent:

UNITED STATES PATENTS

| Number | Name | Date |
| --- | --- | --- |
| 1,324,818 | Hazard | Dec. 16, 1919 |
| 1,743,386 | Paulson | Jan. 14, 1930 |
| 1,931,054 | Butterfield | Oct. 17, 1933 |
| 1,951,461 | Wilson | Mar. 20, 1934 |